United States Patent [19]
Whaling

[11] Patent Number: 5,721,002
[45] Date of Patent: Feb. 24, 1998

[54] AUTOMATED NUT-CRACKING APPARATUS AND METHOD

[76] Inventor: William Keith Whaling, P.O. Box 269, Haaleha, Hi. 96772

[21] Appl. No.: 789,356

[22] Filed: Jan. 27, 1997

[51] Int. Cl.$^6$ .................................................. A23N 5/00
[52] U.S. Cl. ........................... 426/482; 99/568; 99/571; 99/580; 426/481
[58] Field of Search .................... 99/568, 571, 572, 99/580–583, 600, 609, 518, 519; 426/481, 482; 30/120.1–120.5

[56] References Cited

U.S. PATENT DOCUMENTS

| | | | |
|---|---|---|---|
| 758,665 | 5/1904 | Kimball . | |
| 1,125,427 | 1/1915 | Woodson . | |
| 1,504,009 | 8/1924 | Wilms . | |
| 1,598,076 | 8/1926 | Galleazzi . | |
| 2,759,511 | 2/1956 | Jacobson | 146/250 |
| 2,924,259 | 2/1960 | Magnuson | 146/238 |
| 3,561,513 | 2/1971 | Lindsey | 146/12 |
| 3,621,898 | 11/1971 | Turner | 146/12 |
| 3,841,212 | 10/1974 | Powell | 99/571 |
| 3,858,501 | 1/1975 | Pfeiffer | 99/571 |
| 4,085,545 | 4/1978 | Da Silva | 47/58 |
| 4,438,687 | 3/1984 | McNiel | 99/571 |
| 4,441,414 | 4/1984 | Quantz | 99/571 |
| 4,467,710 | 8/1984 | Verma et al. | 99/571 |
| 4,515,076 | 5/1985 | Reznik | 99/571 |
| 4,598,637 | 7/1986 | Brown et al. | 99/580 |
| 4,699,049 | 10/1987 | Mizer | 99/568 |
| 4,805,527 | 2/1989 | Yoshihara | 99/571 |
| 4,819,331 | 4/1989 | Joyama | 30/120.2 |
| 4,838,155 | 6/1989 | Steffel | 99/582 X |
| 4,928,590 | 5/1990 | Joyama et al. | 99/581 X |
| 5,012,580 | 5/1991 | Goulter | 30/120.5 |
| 5,070,617 | 12/1991 | Frederiksen et al. | 30/120.5 |
| 5,208,058 | 5/1993 | Kotani et al. | 426/486 |
| 5,233,747 | 8/1993 | Johnson | 99/568 X |
| 5,239,918 | 8/1993 | Whaling | 99/571 |
| 5,247,879 | 9/1993 | Frederiksen et al. | 99/581 X |
| 5,303,470 | 4/1994 | Wakelam | 426/482 |
| 5,305,688 | 4/1994 | Kotani et al. | 99/580 |
| 5,333,384 | 8/1994 | Graves | 30/120.2 |
| 5,425,527 | 6/1995 | Selbak | 99/568 |
| 5,505,123 | 4/1996 | Kim | 99/579 |
| 5,524,486 | 6/1996 | Turner | 146/15 |

*Primary Examiner*—Timothy F. Simone
*Attorney, Agent, or Firm*—Young & Basile, P.C.

[57] ABSTRACT

A nut-cracking method and apparatus is disclosed, the apparatus comprising at least first and second spaced-apart impact members and a nut-dispenser. The nut-dispenser operates to dispense at least one nut at a sufficient velocity along a first path of travel towards the first impact member, whereupon the at least one nut is redirected by the first impact member at a sufficient velocity along a second path of travel between the first and second impact members. The at least one nut is then cracked on one of the at least first and second impact member. According to the inventive method, at least first and second impact members are provided in spaced-apart relation. At least one nut is dispensed at a sufficient velocity along a first path of travel towards the first impact member such that the at least one nut impacts the first impact member. The at least one nut is subsequently redirected from the first impact member at a sufficient velocity along a second path of travel between the at least first and second impact members such that the at least one nut is cracked upon impact with one of the at least first and second impact members.

19 Claims, 8 Drawing Sheets

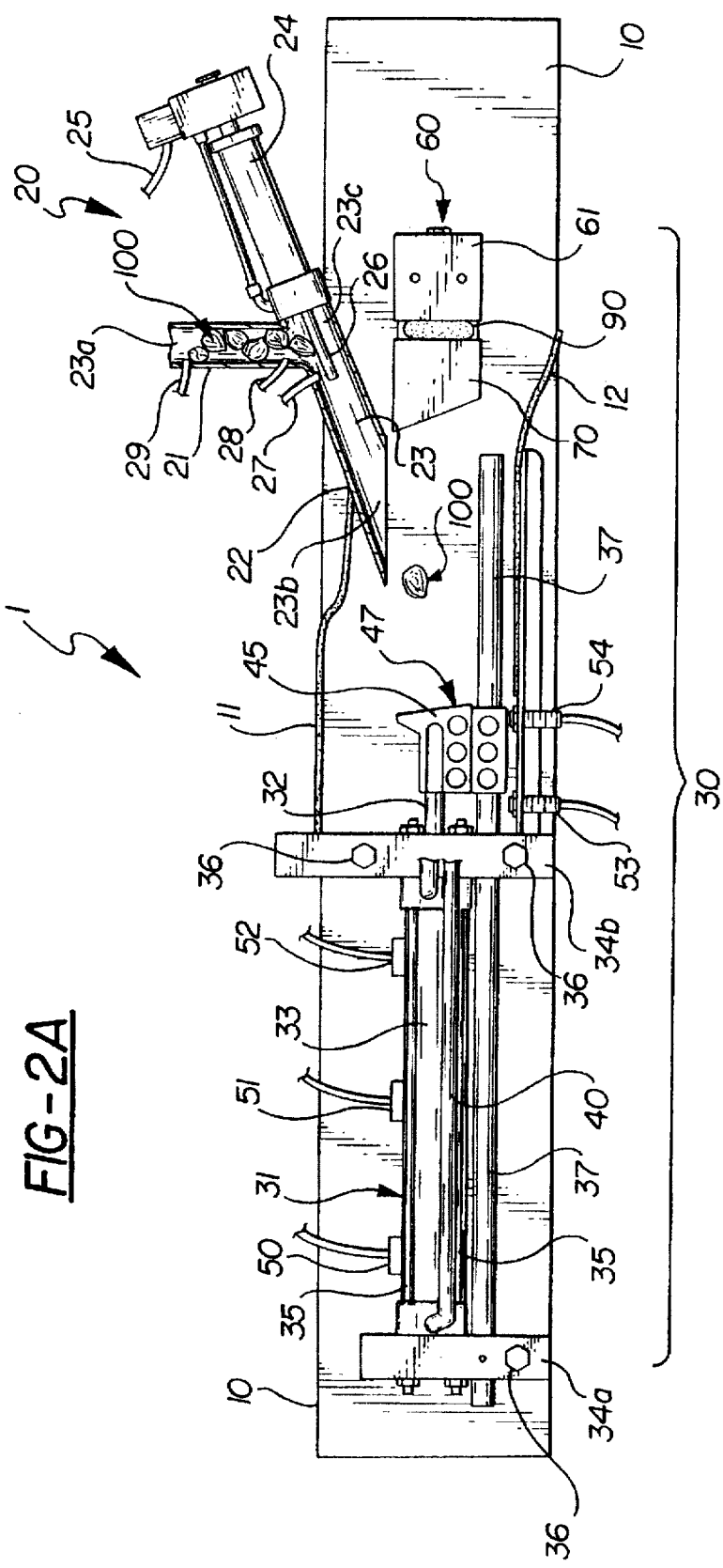

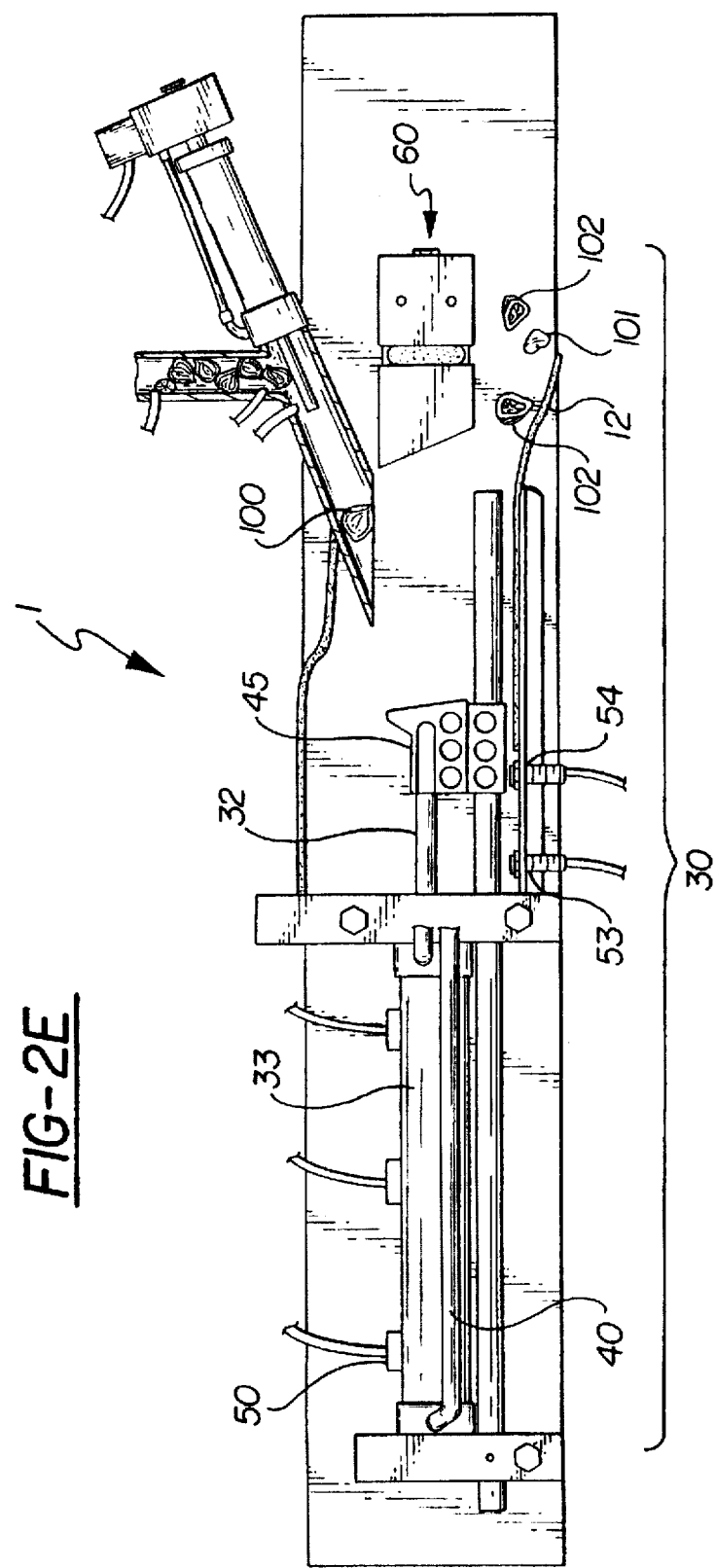

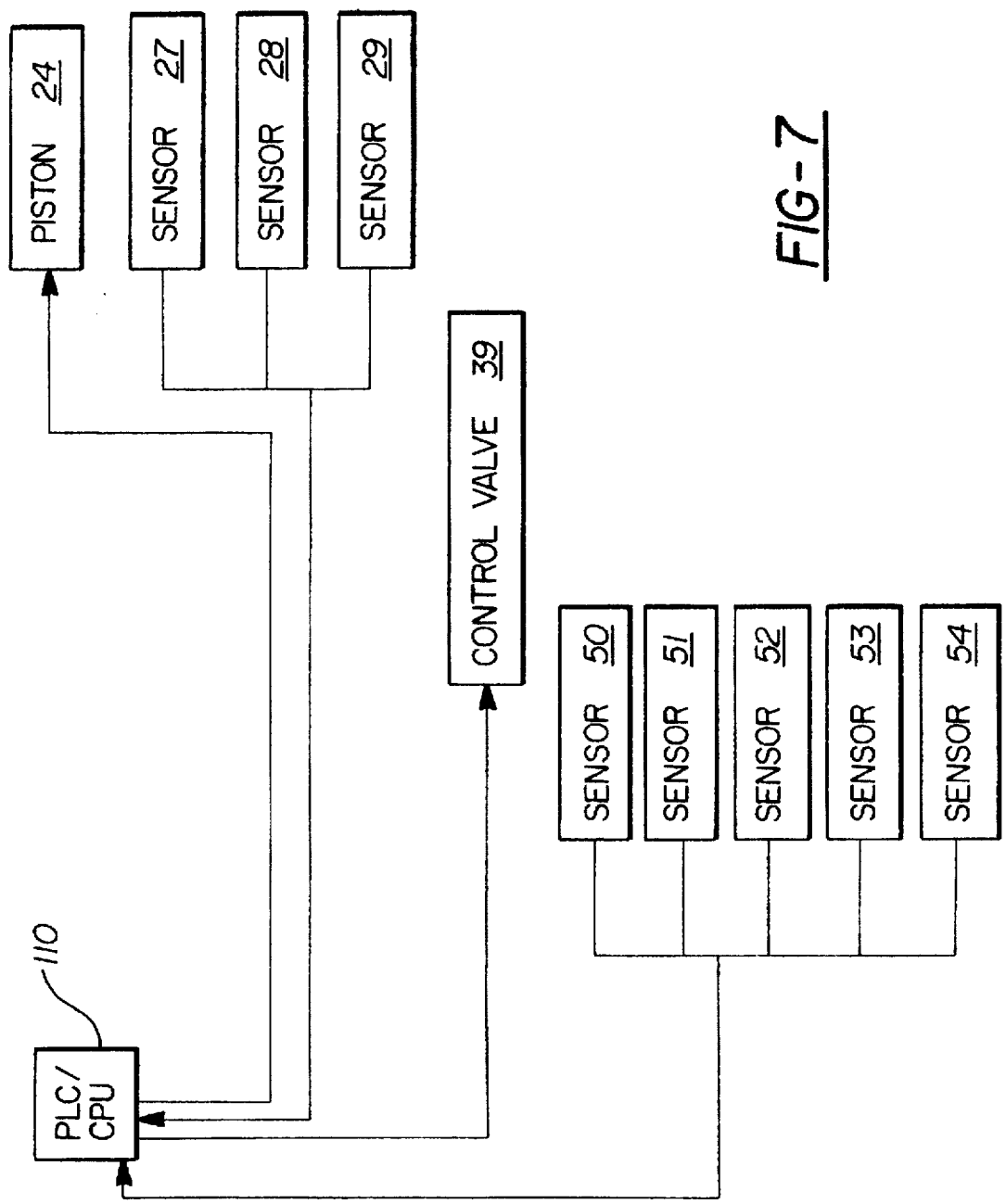

AUTOMATED NUT-CRACKING APPARATUS AND METHOD

FIELD OF THE INVENTION

The present invention relates generally to a method and apparatus for automatically cracking nuts, such as Macadamia nuts, and more particularly to an improved apparatus for cracking nuts wherein at least one nut is directed at a sufficient velocity by a nut dispenser along a first path of travel towards a first impact member, the first impact member redirecting the nut at a sufficient velocity and along a second path of travel between the first and second impact members such that the nut is cracked upon one of the impact members.

BACKGROUND OF THE INVENTION

As a readily available source of protein, nuts are incorporated into many food items and form a staple constituent of the diets of people the world over. Without exception, however, the edible kernel of nuts, the nut meat, is naturally encased in at least one protective exterior covering, or shell. As a result, nut processing —including cracking the nut shell to extract the edible nut meat— is a large industry.

Unlike many nuts, Macadamia nuts are characterized by two shells, including a hard inner shell surrounded by an even thicker outer shell, or husk. Consequently, the nut meat is difficult to extract from the shells, making processing of Macadamia nuts an expensive undertaking.

Several and varied solutions to cracking nuts, including Macadamia nuts, have been proposed. Unfortunately, many of these solutions comprise manually operable devices requiring that each time a nut is to be cracked the user manually position a nut in the device. See, for example, H. H. Turner, U.S. Pat. No. 3,524,486, and Graves, U.S. Pat. No. 5,333,384. This results in both low productivity and high labor costs to nut processors. And while automated nut-cracking devices are known, many suffer from the drawback of making use of mechanical forces such as compression to crush the nut shell. See, for example, Lindsey, U.S. Pat. No. 3,561,513. As a consequence, these devices are prone to damage the nut meat in the process of cracking the shells, reducing the quantity of whole kernels of nut meat obtained thereby. Damage to the nut meat in processing equates to both a loss in supply to the consumer and increased marginal production costs for the nut processor. Damage to the nut meat is also equated with lower consumer demand and, consequently, lower profits for the producer.

Still other prior art automated devices require each nut to be stationary for cracking. See, for example, Verma, et al., U.S. Pat. No. 4,467,710. As with manual prior art devices, this limits productivity and, consequently, increases costs.

SUMMARY OF THE INVENTION

Accordingly, it is an object of the present invention to provide a method and apparatus for automatically and continuously cracking nuts, for example Macadamia nuts, without the use of compression, shearing, or similar mechanical forces so as to avoid damaging the nut meat.

It is still another object of the present invention to provide a method and apparatus for the simple and efficient cracking of nuts, such as Macadamia nuts.

It is a further object of the present inventive method and apparatus to provide for the automatic and continuous cracking of nuts without the need for significant manual labor.

Still a further object of the present invention is to provide a nut-cracking apparatus and method capable of automatically cracking nuts to yield a high percentage of whole kernels of nut meat.

Yet another object of the present invention is to provide a nut-cracking apparatus and method according to which the nuts are not required to be stationary for cracking.

These and other objects and advantages of the present invention are accomplished via a nut-cracking apparatus having at least first and second impact members provided in spaced relation to each other. A nut dispenser operates to dispense at least one nut at a sufficient velocity along a first path of travel towards the first impact member, upon impact with which the at least one nut is subsequently redirected by the first impact member at a sufficient velocity along a second path of travel between the at least first and second impact members such that the at least one nut is cracked upon impact with one of the at least first and second impact members. Because the first and second impact members do not cooperate to crush nuts therebetween via commonly employed mechanical forces such as compression, but rather takes advantage of oscillation of the nut between the at least first and second impact members, it will be appreciated that the present invention conveys the distinct advantage of leaving the nut meat undamaged.

According to one embodiment of the present invention, the first impact member is moveable in at least one direction defining a path of travel towards the second impact member. According to one feature of this embodiment, the nut dispenser operates to dispense at least one nut at a sufficient first velocity along a first path of travel into the path of travel of the first impact member. The first impact member then redirects the nut at a sufficient second velocity along a second path of travel between the at least first and second impact members. As the first impact member moves forward along its path of travel, the distance of the second path of travel traversed by the nut is decreased and, consequently, the oscillating frequency of the nut between impact with each of the at least first and second impact members increases until the nut is cracked. According to this embodiment, the first impact member comprises a nut-impacting hammer disposed on one end of a moveable piston, the hammer including an angled nut-impact face. The second impact member comprises an anvil also having a nut-impact face oriented non-parallel to the impact face of the hammer. The nut dispenser comprises a nut-dispensing piston operable to continuously and automatically dispense at least one nut along the first path of travel and into the path of travel of the nut-impacting hammer in timed relation to the operation of the hammer.

According to another feature of the present invention, the anvil comprises both fixed and floating elements, the floating element being rectilinearly moveable in response to the force of impact of a nut on the impact face of the anvil so as to both absorb the force of impact and to preserve the velocity of the nut as it travels between the at least first and second impact members.

According to a further feature, coordinated operation of the first impact member and the nut dispenser is automatically controlled via a remote controller, for example a programmable logic controller including a central processing unit. The remote controller is responsive to various sensors so that the nut dispenser operates automatically to dispense at least one nut into the path of travel of the first impact member. This yields a high rate of operation of the present invention and enables an output of many cracked nuts per second.

According to the present inventive method, the at least first and second impact members are similarly provided in spaced-apart relation. At least one nut is dispensed at a sufficient velocity along a first path of travel towards the first impact member such that the at least one nut impacts the first impact member. The at least one nut is subsequently redirected from the first impact member at a sufficient velocity along a second path of travel between the at least first and second impact members such that the at least one nut is cracked upon impact with one of the impact members.

BRIEF DESCRIPTION OF THE DRAWINGS

FIGS. 2A through 2E comprise frontal elevational views of the present invention with the shroud removed and a portion of the nut dispenser shown in cross-section, and further depict the apparatus of the present invention in various stages of operation;

FIG. 7 comprises a diagrammatic view of the sensor operation according to the present invention.

DESCRIPTION OF THE ILLUSTRATED EMBODIMENT

With reference now to the drawings, the individual elements of the present inventive nut-cracking apparatus and their interrelation will be better understood.

Figure 1:
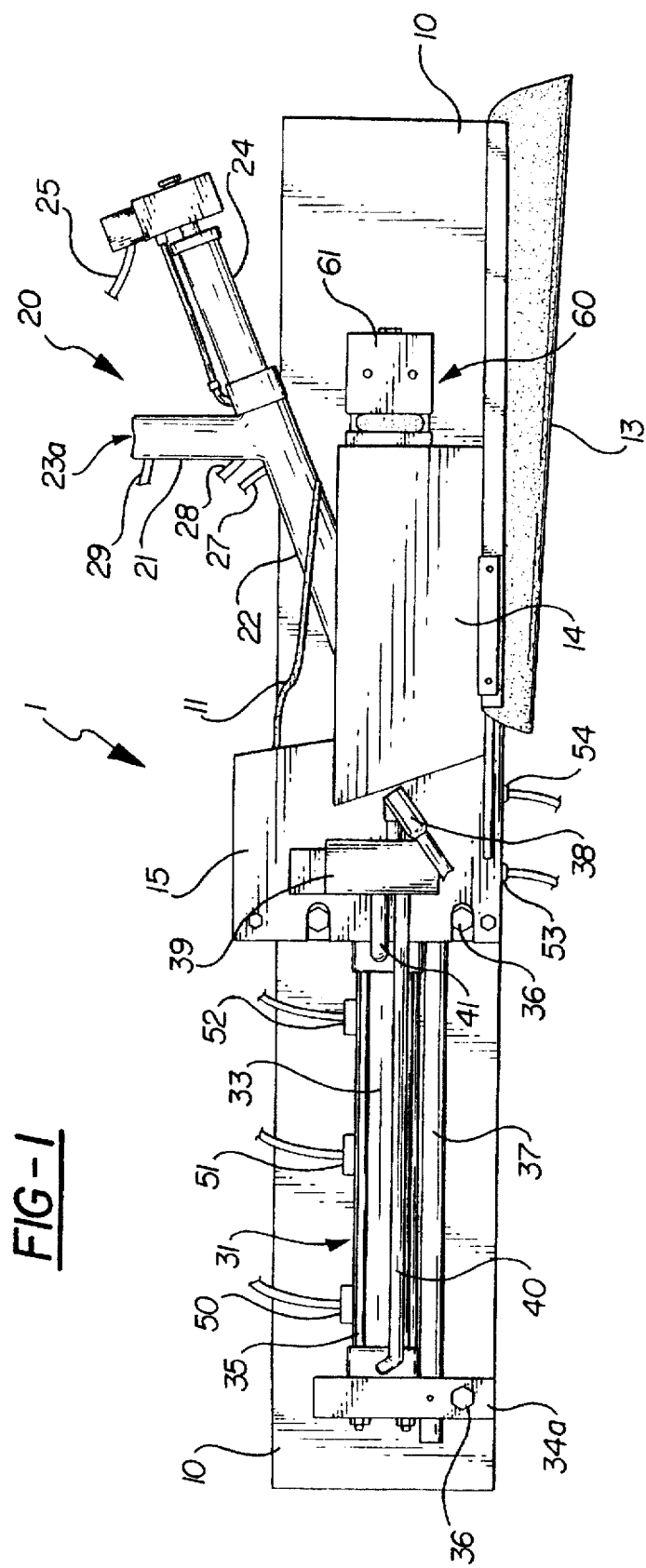
FIG. 1 comprises a frontal elevational view of the present invention.

As shown, the present inventive nut-cracking apparatus 1 generally comprises a vertically oriented, rectangular base plate 10 upon which are fixedly disposed nut dispenser 20 comprising pneumatic piston 24, and at least first 30 and second 60 impact members for cracking nuts automatically and in rapid succession. (FIGS. 1 and 2A.) A remote controller (not shown) is operatively connected to apparatus 1 as described hereinbelow to effect automated operation thereof. And while the present invention is illustrated in a horizontal attitude, apparatus 1 is preferably supported in an inclined position by a stand (not shown) or other means such that second impact member 60 is oriented proximate the ground or other support surface and the principle length of nut dispenser 20 is inclined only a few degrees above horizontal.

Base plate 10 is preferably manufactured from a suitably strong material, such as steel. Upper 11 and lower 12 polymeric shrouds and a metal lateral deflection shield 13 are affixed to base plate 10 so as to substantially enclose the approximately middle third of base plate 10 proximate first 30 and second 60 impact members and nut dispenser 20. As will be appreciated upon further reading of the specification, this helps prevent unwanted and dangerous dispersion of nut meat 101 and nut shells 102 during the operation of apparatus 1. Polymeric chute 13 affixed to the bottom portion of base plate 10 below first 30 and second 60 impact members serves to direct nut meat 101 and shells 102 away from apparatus 1 and into a suitable collection bin or hopper, or onto a conveyor (not shown). In the illustrated embodiment, shrouds 11 and 12 are ideally formed from ABS plastic or other suitably strong material so as to withstand repeated impact from nut meat 101 and nut shells 102 as they are deflected from second impact member 60. Chute 13 is ideally manufactured from vinyl, rubber, or the like. A further shroud 14, preferably manufactured from steel, covers a portion of the area surrounding first impact member 30 rearward of nut dispenser 20.

Still referring to FIGS. 1 and 2A, nut dispenser 20 generally includes first and second cylindrical sections comprising feeder 21 and dispensing 22 tubes. Feeder 21 and dispensing 22 tubes communicate to define a common interior passageway 23 having an input end 23a, an output or dispensing end 23b oriented proximate the area between first 30 and second 50 impact members, and a third opening 23c communicating with pneumatic piston 24. Wiring harness 25 operatively connects piston 24 to a remote controller (not shown) to effect automated operation thereof, as explained further hereinbelow. Piston 24 includes piston rod 26 selectively extendable into passageway 23 of dispensing tube 22 so as to eject nuts out end 23b at a sufficient first velocity, preferably between 50 and 60 mph, along a first path of travel coincident with the path of forward travel of first impact member 30. In its extended position, piston rod 26 preferably sufficiently intrudes into passageway 23 of dispensing tube 22 so as to block the unrestricted travel of nuts 100 thereto from feeder tube 21. In the illustrated embodiment, the predetermined rate of each stroke of piston rod 26 is sufficiently fast so as to prevent more than a single nut 100 from entering passageway 23 of dispensing tube 22. To effect its automatic operation, nut dispenser 20 is provided with first sensors comprising an optical sensor 27 disposed along dispensing tube 22 proximate piston rod 26. As explained in greater detail hereinbelow, sensor 27 is operatively connected to the remote controller (not shown) and preferably positioned to sense the presence or absence of piston rod 26 within dispensing tube 22, such that operation of nut dispenser 20 may be precisely coordinated with the operation of first impact member 30. Sensor 27 may be optical, as shown, or any of a variety of commercially available sensors operable to sense the position of piston rod 26 within passageway 23. Feeder tube 21 is further provided with second sensors comprising optical sensors 28 and 29 operatively connected to the remote controller (not shown). Sensors 28 and 29 function to sense the size and presence, respectively, of nuts 100 within feeder tube 21. Because nuts of smaller diameter must travel further before first impacting first impact member 30, the remote controller (not shown) is programmed to adjust the stroke speed of piston rod 26 in response to input from sensor 28 that a nut below a predetermined diameter is sensed. It will be appreciated that increased stroke speed of piston rod 26 in response to input from sensor 28 also functions, in the illustrated embodiment, to prevent the passage of multiple nuts from feeder tube 21 into dispensing tube 22. Sensor 29 senses the presence or absence of nuts within feeder tube 21, the remote controller being operatively connected to sensor 29 and programmed to slow or arrest operation of apparatus 1 in response to the sensed absence of nuts within feeder tube 21.

In the illustrated embodiment, first impact member 30 is rectilinearly moveable in two directions. First impact member 30 generally includes pneumatic piston 31 and hammer 45, although those of skill in the art will appreciate that other mechanical means may be substituted according to user preference. Piston 31 comprises piston rod 32 and cylinder 33, piston rod 32 being selectively coaxially extendable and retractable relative to cylinder 33 and having, in the illustrated embodiment, approximately a 10" stroke. (FIGS. 1 and 2A.) Cylinder 33 is fixedly mounted between first 34a and second 34b support brackets by first securing means such as the illustrated rods 35, of which four are provided in approximately equidistant relation to define a restraining, cage-like structure. First 34a and second 34b support brackets, in turn, are fixedly mounted to base plate 10 by second securing means, such as the illustrated bolts 36. Piston 31 is coupled to a suitable air supply (not shown) via connection 38. (FIG. 1.) A selectively switchable valve 39 operatively connected to the remote controller (not shown) and interposed between connection 38 and forward 40 and rearward 41 air supply conduits functions to selectively regulate the flow of air through either of supply conduits 40 and 41, thereby effecting the direction of movement of piston rod 32. Still referring to FIGS. 1 and 2A, disposed at the free end of piston rod 32 is hammer 45. Hammer 45 is slidingly disposed on guide rod 37 so as to ensure smooth rectilinear movement of hammer 45 throughout its range of motion. As shown in FIG. 3, guide rod 37 is slidingly received through coaxial bore 46 of slightly larger diameter provided in hammer 45. Referring also to FIG. 2A, hammer 45 is characterized by an obtusely angled nut-impact face 47 opening towards dispensing end 23b of nut dispenser 20. In the preferred embodiment, hammer 45 includes a plurality of cut-out portions 48 designed to reduce the weight of hammer 45 without compromising the strength thereof. Referring again to FIGS. 1 and 2A, first impact member 30 includes third sensors comprising a plurality of proximity sensors 50 through 54 disposed along the length of cylinder 33 and the path of travel of hammer 45 and piston rod 32 forward of bracket 34b. Sensors 50 through 54 are each operatively connected to the remote controller (not shown) and function to sense the positions of piston rod 32 and hammer 45 and provide this information to the remote controller. In the preferred embodiment, sensors 50 through 52 are slidably mounted on cylinder 33 so as to be selectively longitudinally positionable therealong. As will become apparent with reference to the remainder of this specification, selective positioning of sensors 50 through 52 permits adjustments in the operation of apparatus 1. And while proximity sensors are depicted, it will be appreciated by those of skill that any of a variety of commercially available sensors may be substituted therefor according to user preference.

Referring now to FIGS. 2A and 4 through 6, second impact member 60 comprises an anvil provided in spaced-apart, opposing relation to hammer 45 of first impact member 30. Preferably, the anvil comprises both fixed 61 and floating 70 elements and sled 76, each manufactured from a suitably strong material such as steel. Floating element 70 includes an angled nut-impact face 71 opening downwardly towards shroud 12. As explained hereinbelow, nut-striking face 71 is preferably non-parallel to impact face 47 of hammer 45 in the assembled apparatus 1, the ideal differential in their respective orientations being approximately 19 degrees. Sled 76 is characterized by a trapezoidal cross-section, and each anvil element 61 and 70 includes a track 62 and 72, respectively, formed on corresponding surfaces thereof and complimentary to the shape of sled 76 for receiving the same therein. Both sled 76 and fixed element 61 are fixedly mounted to base plate 10 by suitable securing means, for example bolts or the like, which are threadingly received in threaded bores 63 and 77 provided on rear surfaces of fixed element 61 and sled 76, respectively. Floating element 70 is slidingly disposed on sled 76 so as to be capable of limited forward and rearward rectilinear movement. Floating element 70 is restrained in its movement relative to fixed element 61 by restraining means, such as the illustrated bolt 80, which includes a threaded tip 81 threadingly connected to a correspondingly threaded bore 73 in floating element 70 (shown in dashed lines). Principle length 82 of bolt 80 is preferably smooth and is slidingly disposed within bore 64 in fixed element 61 so as to provide floating element 70 with a range of movement equivalent to a portion of the length of bolt 80, preferably about 2 centimeters. Corresponding slidingly axially mated male 65 and female 74 (shown in dashed lines) portions provided in fixed 61 and floating 70 elements, respectively, ensure precise axial alignment of fixed 61 and floating 70 elements during movement of floating element 70. Annular gasket 90 is provided securely about male portion 65 and sandwiched between fixed 61 and floating 70 elements. Gasket 90 is preferably made of rubber, nylon, or the like and is axially compressible so as to both disperse the force of impact as fixed 61 and floating 70 elements are forced together during operation of the present invention, as well as to urge floating 70 and fixed 61 elements apart when the force of impact is dispersed. Ideally, the uncompressed thickness of gasket 90 is approximately 2 centimeters.

Figure 2B:
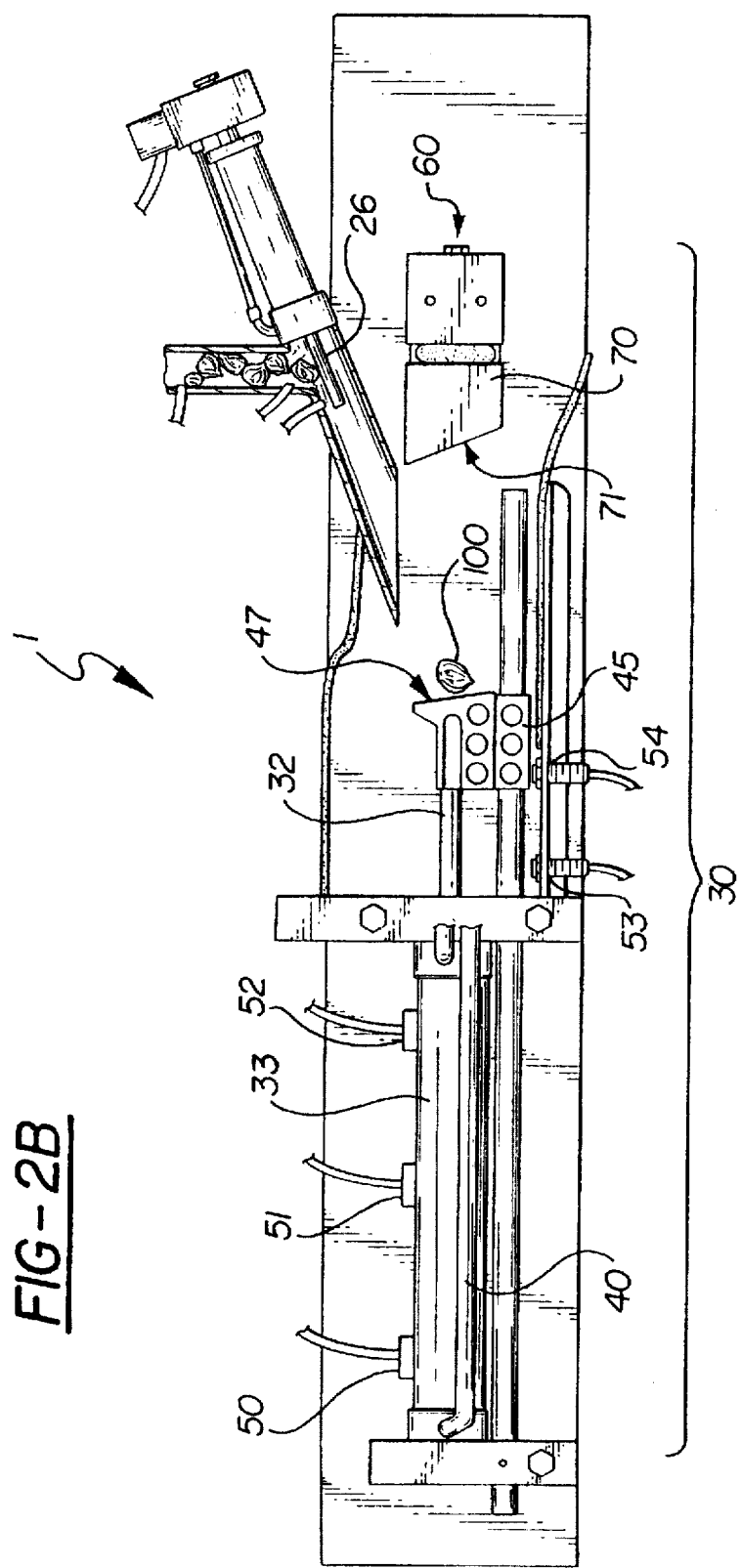
Figure 2C:
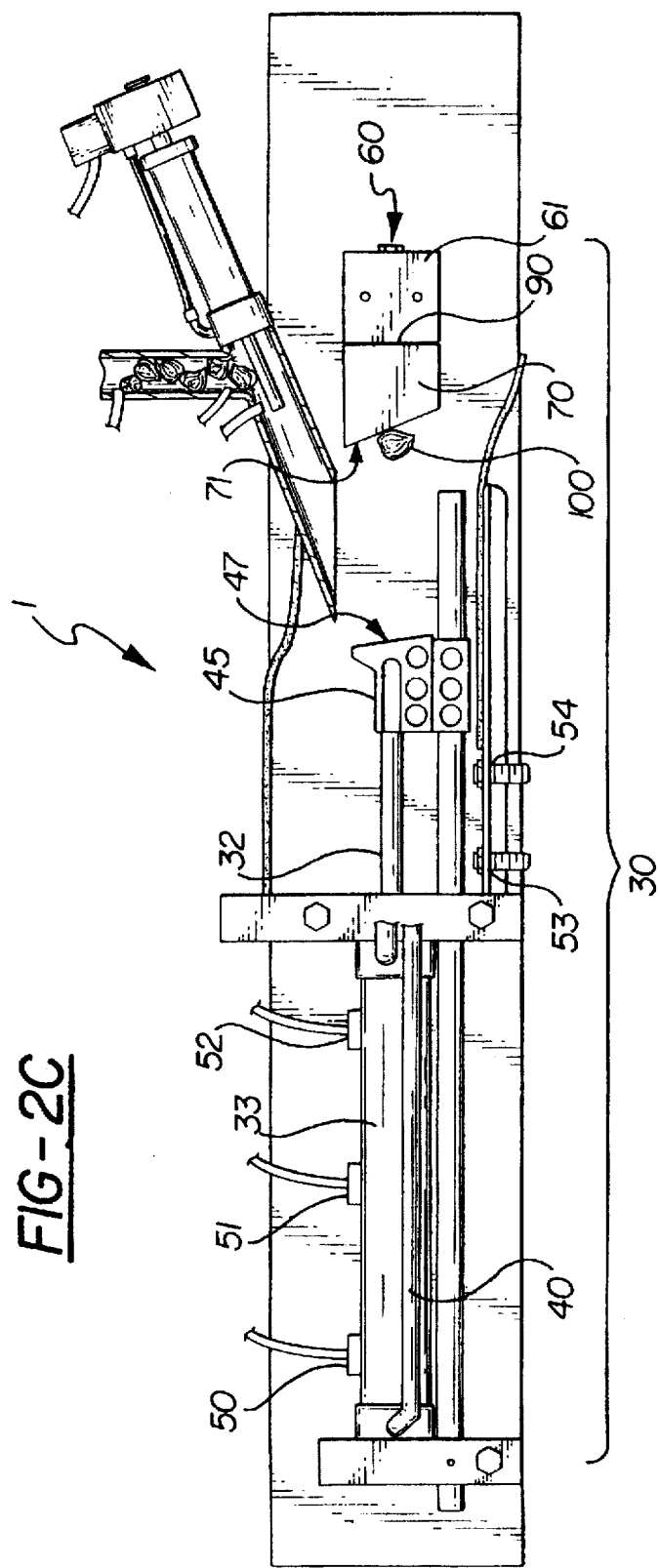
Figure 2D:
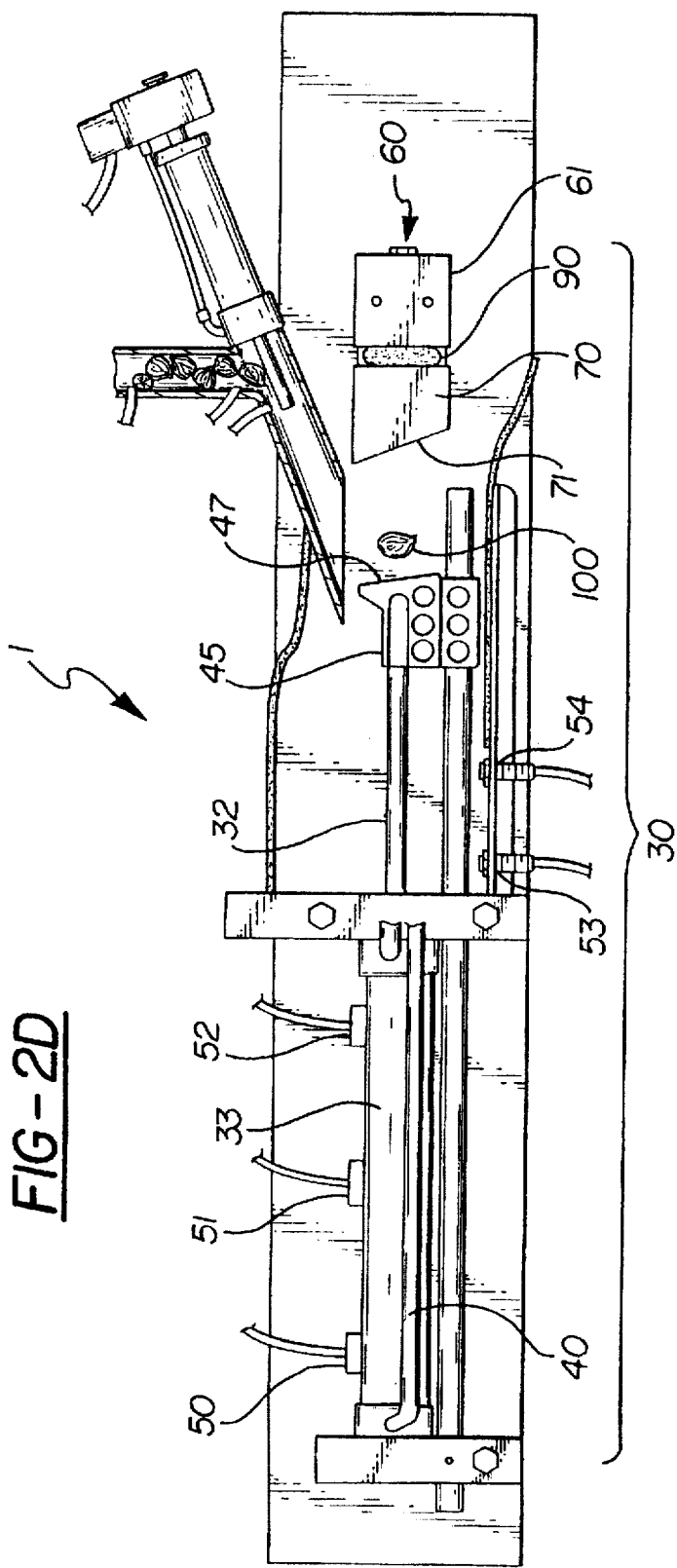
Figure 3:
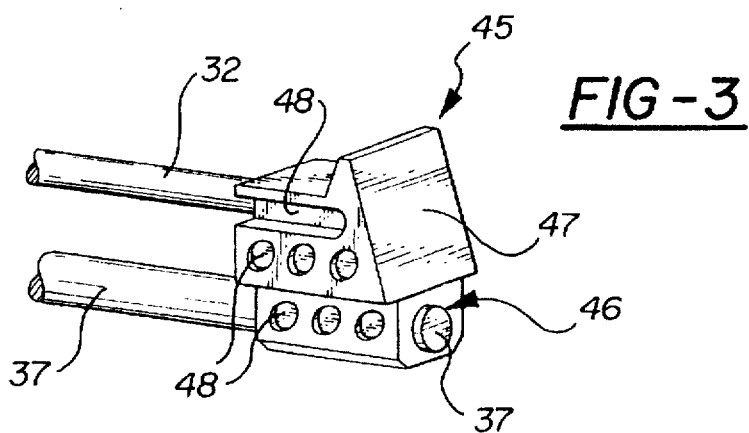
FIG. 3 comprises a perspective view of the nut-impacting hammer of the first impact member.
Figure 4:
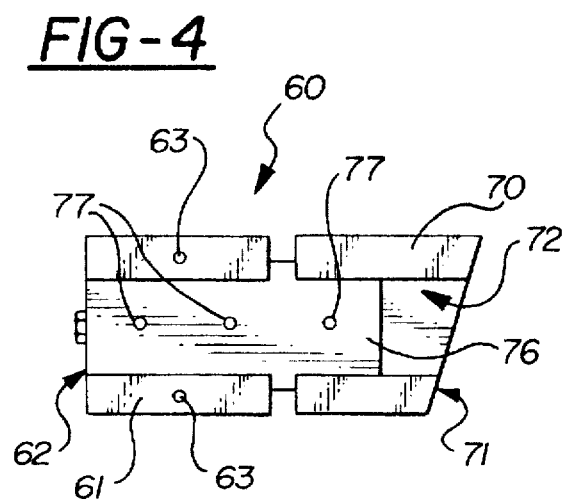
FIG. 4 comprises a rear elevational view of the anvil of the second impact member of the present invention.
Figure 6:
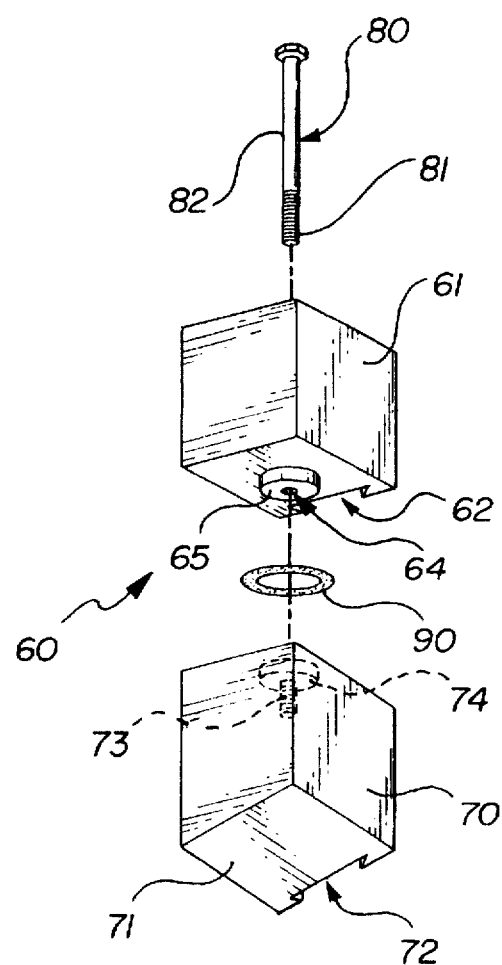
FIG. 6 comprises an exploded perspective view of the anvil of the second impact member of the present invention.
Figure 5:
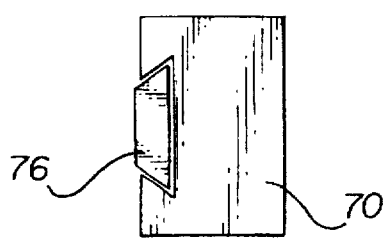
FIG. 5 comprises a left-side elevational view of the anvil shown in FIG. 4.

Referring now to FIGS. 2A through 2E, operation of both the present inventive apparatus and method will be better understood. In the first instance, one and preferably more nuts 100 are loaded into feeder tube 21 or an even larger hopper or conveyor means communicating therewith (not shown). Piston rod 26 of nut-dispensing mechanism 20 rapidly retracts to permit passage of a single nut 100 into passageway 23 of dispensing tube 22. As piston rod 26 extends back into passageway 23, nut 100 is discharged through opening 23b at a first velocity, preferably between approximately 50 and 60 mph, along a first path of travel coincident with a point along the path of travel of hammer 45, which moves rectilinearly toward second impact member 60 at a velocity preferably between approximately 250 mph and 360 mph. (FIG. 2A.) In the illustrated embodiment, nut 100 travels approximately 6 inches from the point of impact with piston rod 26 until striking impact face 47. (FIG. 2B.) Due to both the angular relation of nut-impact face 47 relative to the first path of travel of nut 100, as well as the point at which nut 100 strikes impact face 47, the nut strikes face 47 and is redirected away therefrom at a sufficient second velocity along a second path of travel towards nut-impact face 71 of floating element 70. The most preferred second velocity is approximately 350 mph. The second path of travel of nut 100 is defined between impact faces 47 and 71, and the second velocity of nut 100 is sufficient such that nut 100 travels along the second path of travel until impact with nut-impact face 71 (FIG. 2C), whereupon floating element 70 is driven rearward towards fixed element 61; gasket 90 compressing to disperse the force of impact. In some instances experimentation has demonstrated that the nut is cracked upon its first impact with impact face 71. However, the majority of nuts are preferably directed away from impact-face 71 and along the second path of travel back towards impact face 47 as gasket 90 urges floating element 70 axially away from fixed element 61. (FIG. 2D.) In operation, oscillation of nut 100 along the second path of travel between impact-faces 47 and 71 may occur one or more times before the nut is cracked and nut meat 101 and nut shell halves 102 are directed towards shroud 12. (FIG. 2E.) From this point, nut meat 101 and shell halves 102 travel through chute 13 (not shown) and into an awaiting hopper or conveyor means (not shown) where the nut meat can be separated from the shells by any desired operation. Still referring to FIGS. 2A through 2E, it will be appreciated that nut 100 first strikes impact face 47 relatively early in the forward travel of hammer 45, such that the second path of travel of nut 100 between impact faces 47 and 71 is successively decreasing in dimensions before hammer 45 is retracted. And while first 30 and second 60 do not operate to crush nut 100 therebetween, it will be appreciated that the successive decrease in the second path of travel between impact faces 47 and 71 serves to increase the oscillating frequency of nut 100 between impact faces 47 and 71 prior to cracking. The present invention is therefore distinguishable from the prior art in that first 30 and second 60 impact members do not act to crush the nut therebetween. Consequently, experimental operation of the present invention with Macadamia nuts has yielded a high output of cracked Macadamia nuts with approximately 93% of the nut meat whole and undamaged.

Referring now to FIGS. 1, 2A through 2E, and 7, the latter of which comprises a diagrammatic view of the interrelation of the remote controller and the rest of the present inventive apparatus, automated operation of the present invention will be better understood.

As shown in FIG. 7, the remote controller 110 preferably comprise a programmable logic controller, or PLC, including a central processing unit, or CPU, the operation of which is preferably directed by a lateral logic-type program. The diagrammatic arrows of FIG. 7 depict operative connections between remote controller 110 and the identified elements, for example, wiring harnesses; the direction of the arrows representing the direction of input of operating signals between remote controller 110 and the various indicated elements.

In operation of apparatus 1 as described above, proximity sensor 50 senses the presence of fully retracted piston rod 32. In response to signal from sensor 50, remote controller 110 directs control valve 39 (shown in FIG. 1) to open such that air is forced into cylinder 23 via air supply conduit 40 and piston rod 32 is driven forward. (FIG. 2A.) Successive sensor 51 also senses the position of piston rod 32 within cylinder 33, remote controller 110 programmed to open valve 39 (shown in FIG. 1) in response to sensor 51 such that piston rod 32 continues to be driven forward. (FIG. 2B.) Sensor 52 is positioned along cylinder 33 at a position up to the maximum extension of piston rod 32 therein, remote controller 110 being programmed to switch valve 39 (shown in FIG. 1) in response to signal from sensor 52 so that air is forced through air supply conduit 41 and piston rod 32 is driven rearwards into cylinder 33. (FIG. 2E.) Sensor 53 senses hammer 45 when the same is proximate thereto. In response to input from sensor 53 sensing hammer 45, remote controller 110 is programmed to ignore input from sensor 54 until hammer 45 passes thereover a second time, following which remote controller 110 is programmed to activate nut dispenser 20 to dispense another nut 100. (FIG. 2E.) In this manner, nut 100 impacts nut-impact face 47 at an appropriate position in its path of forward travel so that the nut is redirected towards impact-face 71.

Referring now to FIGS. 2A and 7, operation of piston 24 by remote controller 110 is further directed by sensors 27 through 29. In the preferred embodiment, sensor 27 senses the presence of piston rod 26 within dispensing tube 22. Activation of piston 54 by remote controller 110 is governed by input to the PLC from sensor 27, remote controller 110 being programmed, in response to input from sensor 27 that piston rod 26 is present in dispensing tube 22, to operate piston rod 26 within a predetermined time period. It will be appreciated that remote controller 110 is preferably programmed so that operation of piston 24, in response to input from sensor 27, is such that nut 100 impacts impact-fact 47 of hammer 45 at a point during the forward movement thereof and nut 100 is redirected towards impact-face 71 of floating element 70. Accordingly, remote controller 110 is preferably programmed to take into account the rate of travel of nut 100 towards hammer 45, the forward rate of travel of hammer 45, the distance travelled by nut 100 from the time it is ejected by nut dispenser 20 until impact with hammer 45, and the stroke length of piston rod 32. At a minimum, these factors must be considered in programming remote controller 110 to activate nut dispenser 20 at an appropriate time after sensor 54 is activated a second time, so that nut 100 impacts hammer 45 at an appropriate distance with respect to impact-face 71. As indicated, the stroke length of piston 32 in the illustrated embodiment is approximately 10", while the distance travelled by nut 100 from the point of impact with piston 26 until striking impact-face 47 is approximately 6" Similarly, as variations are introduced with respect to the stroke length of piston 32, the rate of forward travel of both hammer 45 and nut 100, and the distance travelled by nut 100 prior to impact with impact-face 47, remote controller 110 may be programmed to operate piston 24 within a different time period. Sensor 28, disposed along feeder tube 21 and sensing the next nut 100 to enter dispensing tube 22, senses the size of this nut. Since variation in size of the nuts travelling through dispensing tube 22 will affect the point of first impact between nut 100 and impact-face 47 of hammer 45 —with smaller nuts having to travel a further distance prior to impact —remote controller 110 is programmed to respond to sensor 28 to adjust the time frame for operation of piston 24 when a nut below a predetermined diameter is sensed. Finally, sensor 29 is disposed along feeder tube 21 at a predetermined distance remote from sensor 28. Sensor 29 senses the presence of nuts 100 within feeder tube 21, remote controller 110 being programmed to slow or cease operation of apparatus 1 in response to input from sensor 29 that no more nuts 100 are present within feeder tube 21.

It will be appreciated with reference to the foregoing that the method of the present invention coincides with the above described operation of the inventive apparatus, and that such method is simple and easy to practice and may be accomplished with relatively little expense and with great reduction in production cost to the nut producer.

Of course, it will also be appreciated that the foregoing is merely illustrative of one embodiment of the present inventive apparatus and method, and additional modifications and improvements, apparent to those of skill in the art, are certainly possible without departing from the spirit and broader aspects of this invention as set forth in the appended claims.

The invention in which an exclusive property or privilege is claimed is defined as follows:

1. A nut-cracking apparatus, comprising:
   at least first and second spaced-apart impact members;
   a nut dispenser operative to dispense at least one nut at a sufficient velocity along a first path of travel towards said first impact member, said first impact member redirecting said at least one nut at a sufficient velocity along a second path of travel between said at least first and second impact members such that said at least one nut is cracked upon impact with one of said at least first and second impact members.

2. The nut-cracking apparatus of claim 1, wherein said first impact member is moveable in at least one direction defining a path of travel towards said second impact member, said nut dispenser is operative to dispense said at least one nut into said path of travel of said first impact member at a sufficient first velocity, and wherein further said first impact member is operative to redirect said at least one nut along said second path of travel at a sufficient second velocity.

3. The nut-cracking apparatus of claim 2, further including a remote controller operative to automatically control the coordinated operation of said nut dispenser and said first impact member such that said one or more nuts are continuously automatically cracked.

4. The nut-cracking apparatus of claim 3, wherein said first impact member comprises a pneumatic piston having provided thereupon a hammer, said hammer including a nut-impact face.

5. The nut-cracking apparatus of claim 4, wherein said nut-impact face of said hammer is angled so as to open towards said nut-dispensing means.

6. The nut-cracking apparatus of claim 5, wherein said second impact member comprises an anvil including a nut-impact face.

7. The nut-cracking apparatus of claim 6, wherein said nut-impact face of said anvil is angled so as to be non-parallel with respect to said nut-impact face of said hammer.

8. The nut-cracking apparatus of claim 7, wherein the differential between the orientations of said nut-impact face of said anvil and said nut-impact face of said hammer is approximately 19 degrees.

9. The nut-cracking apparatus of claim 8, wherein said anvil further comprises fixed and floating elements, said floating element including said nut-impact face and being at least rectilinearly moveable in relation to said fixed element.

10. A nut-cracking apparatus, comprising:
   at least first and second spaced-apart impact members, said first impact member moveable in at least one direction defining a path of travel towards said second impact member;
   a nut dispenser operative to dispense at least one nut at a sufficient first velocity along a first path of travel into said path of travel of said first impact member; and
   said first impact member being operative to redirect said at least one nut at a sufficient second velocity along a second path of travel between said at least first and second impact members such that said at least one nut is cracked upon impact with one of said at least first and second impact members.

11. The nut-cracking apparatus of claim 10, further including a remote controller operative to automatically control the coordinated operation of said nut dispenser and said first impact member such that said one or more nuts are continuously automatically cracked.

12. The nut-cracking apparatus of claim 11, wherein said remote controller is responsive to input from one or more sensors to effect automatic coordinated operation of said nut-dispenser and said first impact member.

13. The nut-cracking apparatus of claim 12, wherein said first impact member comprises a pneumatic piston having provided thereupon a hammer, said hammer including a nut-impact face.

14. The nut-cracking apparatus of claim 13, wherein said nut-impact face is angled so as to open towards said nut-dispensing means.

15. The nut-cracking apparatus of claim 14, wherein said second impact member comprises an anvil including a nut-impact face.

16. The nut-cracking apparatus of claim 15, wherein said nut-impact face of said anvil is angled so as to be non-parallel with respect to said nut-impact face of said hammer.

17. The nut-cracking apparatus of claim 16, wherein the differential between the orientations of said nut-impact face of said anvil and said nut-impact face of said hammer is approximately 19 degrees.

18. The nut-cracking apparatus of claim 17, wherein said anvil further comprises fixed and floating elements, said floating element being at least rectilinearly moveable in relation to said fixed element.

19. A method for cracking nuts, comprising the steps of:
   providing at least first and second impact members in spaced-apart relation;
   dispensing at least one nut at a sufficient velocity along a first path of travel towards said first impact member such that said at least one nut impacts said first impact member; and
   redirecting said at least one nut away from said first impact member at a sufficient velocity along a second path of travel between said at least first and second impact members such that said at least one nut is cracked upon impact with one of said at least first and second impact members.

* * * * *

UNITED STATES PATENT AND TRADEMARK OFFICE
CERTIFICATE OF CORRECTION

PATENT NO. : 5,721,002
DATED : 2-24-98
INVENTOR(S) : Whaling

It is certified that error appears in the above-indentified patent and that said Letters Patent is hereby corrected as shown below:

In References Cited, last item, delete "5,524,486  6/1996" and replace with --3,524,486  8/1970--.

For Inventor, delete "Haalecha" and replace with --Naalehu--.

Signed and Sealed this

Second Day of June, 1998

Attest:

BRUCE LEHMAN

*Attesting Officer*      *Commissioner of Patents and Trademarks*